(12) United States Patent
Taylor

(10) Patent No.: US 12,247,187 B2
(45) Date of Patent: Mar. 11, 2025

(54) DEVICE FOR INFUSING SMOKE FLAVOR INTO BEVERAGES

(71) Applicant: Bradford Taylor, Salisbury, NC (US)

(72) Inventor: Bradford Taylor, Salisbury, NC (US)

(*) Notice: Subject to any disclaimer, the term of this patent is extended or adjusted under 35 U.S.C. 154(b) by 683 days.

(21) Appl. No.: 17/558,302

(22) Filed: Dec. 21, 2021

(65) Prior Publication Data

US 2023/0193173 A1    Jun. 22, 2023

(51) Int. Cl.
*C12G 3/07* (2006.01)
*A23B 4/052* (2006.01)

(52) U.S. Cl.
CPC ............. *C12G 3/07* (2019.02); *A23B 4/052* (2013.01); *A23V 2002/00* (2013.01)

(58) Field of Classification Search
CPC .... A23B 4/052; A23V 2002/00; C12C 5/026; C12G 3/07
See application file for complete search history.

(56) References Cited

U.S. PATENT DOCUMENTS 1,990,831 A * 2/1935 Lea .................. B01D 3/00
                                                    202/180
2016/0331913 A1* 11/2016 Bourque ........... A61M 15/0043

FOREIGN PATENT DOCUMENTS

CN    206137541 U  *  5/2017
CN    113768075 A  * 12/2021

* cited by examiner

Primary Examiner — Thien S Tran
(74) Attorney, Agent, or Firm — Jeffrey C. Watson, Esq.; Grell & Watson Patent Attorneys LLC

(57) ABSTRACT

A device for infusing smoke flavor into beverages includes a board, at least one recessed smoking well, an infuser and tubing. The board has a board thickness. The at least one recessed smoking well is recessed into a top surface of the board. The infuser is housed inside of the board. The infuser is configured to create smoke. The infuser includes a fan configured to direct the smoke created. The tubing connects the infuser to the recessed smoking well. Wherein, once lit, the infuser is configured to direct smoke it creates through the tubing and into the recessed smoking well. Whereby, the device is configured to infuse smoke flavor into a glass containing the beverage positioned in the recessed smoking well by directing smoke created from the infuser through the tubing and into the recessed smoking well.

19 Claims, 17 Drawing Sheets

DEVICE FOR INFUSING SMOKE FLAVOR INTO BEVERAGES

FIELD OF THE DISCLOSURE

The present disclosure is directed to an all-inclusive device and means to infuse smoke flavor into beverages, like alcoholic beverages or cocktails.

BACKGROUND

Generally speaking, a cocktail smoker is a device that adds visual smoke as well as smoky flavor to a drink. There are different formats and set-ups, such as the smoking box, the smoking cloche and the smoking lid, but they all involve the use of a smoker gun and wood chips. With each of these cocktail smoking devices, the user heats wood chips in a chamber of the smoking gun, with a hose attached at the end of the gun. The operator then puts that hose through the opening in the box or lid. Once the chips are hot, the device is turned on to start blowing smoke into the cocktail. In a matter of seconds, you've got a smoked cocktail that looks cool and tastes amazing.

As examples, and clearly not limited thereto, cocktail smokers are perfect for infusing smoky flavor to scotch and whiskey style drinks. More specifically, for an old-fashioned or a Manhattan, you can break out a smoking gun or smoking box and enhance these types of drinks with all sorts of smoky flavors and appearance.

There are a couple of different ways to smoke a cocktail, depending on the type of flavor you're going for in your drinks. The easiest way is to smoke rinse the glass, not the cocktail. Smoke sticks to things that are chilled, so you can smoke an empty, chilled glass before even pouring your cocktail. This method offers the lightest smoke flavor, with just a hint of smokiness that won't have a heavy effect on the taste of your drink. If it's a heavier, smokier flavor you're going for, you'll want to make your cocktail in your glass and smoke the entire thing. With some wood and some heat, you can turn any drink into a smoky sensation that looks like it just came out of a laboratory.

The instant disclosure recognizes the need to improve on the known cocktail smokers, like by providing a simpler all-in-one or all-inclusive device for infusing smoke flavors into cocktails.

The instant disclosure may be designed to address at least certain aspects of the problems or needs discussed above by providing a device for infusing smoke flavor into beverages, like alcoholic beverages or cocktails.

SUMMARY

The present disclosure may solve the aforementioned limitations of the currently available cocktail smokers by providing a device for infusing smoke flavor into beverages. The device for infusing smoke flavors into beverages may generally include a board, at least one recessed smoking well, an infuser and tubing. The board may have a board thickness. The at least one recessed smoking well may be recessed into a top surface of the board. The infuser may be housed inside of the board. The infuser may be configured to create smoke. The infuser may include a fan configured to direct the smoke created. The tubing may connect the infuser to the recessed smoking well. Wherein, once lit, the infuser may be configured to direct smoke it creates through the tubing and into the recessed smoking well. Whereby, the device may be configured to infuse smoke flavor into a glass containing the beverage positioned in the recessed smoking well by directing smoke created from the infuser through the tubing and into the recessed smoking well.

In select embodiments of the disclosed device for infusing smoke flavor into beverages, the recessed smoking well may include a cloche. The cloche may be configured to cover the recessed smoking well for holding the smoke inside of the recessed smoking well. The recessed smoking well may include an outer recessed cloche ring configured to receive the cloche therein. The outer recessed cloche ring may have a cloche diameter and a ring thickness. The cloche diameter and the ring thickness may be sized and configured to receive the cloche into the outer recessed cloche ring.

Another feature of the disclosed device for infusing smoke flavor into beverages may be that the recessed smoking well may further include a recessed glass hole. The recessed glass hole may be configured to recess a glass containing the beverage into the thickness of the board. The recessed glass hole may include a glass diameter and a depth. The glass diameter and the depth may be sized and configured to position and maintain the glass inside of the recessed smoking well.

One feature of the disclosed device for infusing smoke flavor into beverages may be that in select embodiments the recessed smoking well may further include a smoke passageway. The smoke passageway may interconnect a top surface of the board to an inside of the recessed smoking well. In select embodiments, the smoke passageway may include a first smoke hole and a second smoke hole. The first smoke hole may be horizontally drilled from a recessed glass hole in the recessed smoking well. The second smoke hole may be vertically drilled at an angle from the top surface of the board. The first smoke hole may be connected to the second smoke hole. Wherein, the tubing from the infuser may be connected to the second smoke hole for directing smoke created from the infuser through the second smoke hole, through the smoke passageway and out of the first smoke hole into the recessed smoking well. In select embodiments, the second smoke hole may include a stub. The stub may be connected to the second smoke hole for directing the smoke created from the infuser further into the recessed smoking well.

Another feature of the disclosed device for infusing smoke flavor into beverages may be that the tubing can include a spiraled portion. The spiraled portion may be between the infuser and the recessed smoking well. The spiraled portion of the tubing may be configured to extend a length of the tubing between the infuser and the recessed smoking well.

Another feature of the disclosed device for infusing smoke flavor into beverages may be that the board can further include an infuser housing. The infuser housing may be configured for housing the infuser in the board. The infuser housing may house the infuser on a bottom of the board. In select embodiments, the infuser housing can include an infuser cutout portion and recessed wire area. The infuser cutout portion may be from the bottom of the board through the thickness of the board to a top surface of the board. The infuser cutout portion may be sized and configured to contain the infuser. The recessed wire area may be adjacent to the infuser cutout portion. In select embodiments, the recessed wire area may include a tubing hole and a switch hole. The tubing hole may be cut through to the top surface of the board. The tubing hole may be configured to receive the tubing therethrough. The switch hole may be cut through to the top surface of the board. The switch hole may be configured to hold a switch for the infuser. The switch may be configured to activate the infuser. In select embodiments, the switch of the infuser may be installed into the switch hole via a locking nut. A cover may also be included with the recessed wire area. The cover may be removably attached to the recessed wire area. The cover for the recessed wire area may be configured to conceal the recessed wire area.

Another feature of the disclosed device for infusing smoke flavor into beverages may be that the infuser can include wiring. The wiring may be connected between the switch in the recessed wire area and the fan of the infuser in the infuser cutout portion. In select embodiments, the wiring may include bullet connectors for connecting the wiring between the switch in the recessed wire area and the infuser.

Another feature of the disclosed device for infusing smoke flavor into beverages may be that the infuser can include a frame. The frame may be configured to surround the infuser. In select embodiments, the frame can include a first frame hole and a second frame hole. The first frame hole may be configured to receive the wiring therethrough. The second fame hole may be configured to receive the tubing therethrough for connecting the tubing to an outlet of the infuser. Wherein, in select embodiments, the frame may be glued in positioned in the infuser cutout portion.

Another feature of the disclosed device for infusing smoke flavor into beverages may be that the tubing may include an elbow connection. The elbow connection may be in the recessed wiring area. The elbow connection may be configured to connect the outlet of the infuser with the tubing through the second frame hole.

Another feature of the disclosed device for infusing smoke flavor into beverages may be that the infuser can include a power source. In select embodiments, the power source may be a wired powered source, a battery powered source, and/or combinations thereof.

Another feature of the disclosed device for infusing smoke flavor into beverages may be that the infuser can include a smoke box area. The smoke box area may be configured for inserting and lighting a desired flavor material therein. Wherein the fan of the infuser is configured to direct smoke created in the smoke box area with the desired flavor material out of an outlet.

Another feature of the disclosed device for infusing smoke flavor into beverages may be that it can be configured as a double infuser device. The double infuser device configuration may include two recessed smoking wells. Each of the two recessed smoking wells may be recessed into the top surface of the board. Wherein, the tubing may include a T-connector for splitting the tubing for connecting the tubing to both of the two recessed smoking wells. Wherein, once lit, the infuser may be configured to direct smoke it creates through the tubing and into each of the two recessed smoking wells.

In another aspect, the instant disclosure embraces the device for infusing smoke flavor into beverages in any embodiment and/or combination of embodiments shown and/or described herein.

In another aspect, the instant disclosure embraces a method of making a device for infusing smoke flavor into beverages. In general, the disclosed method of making a device infusing smoke flavor into beverages may include making any embodiment and/or combination of embodiments of the device for infusing smoke flavor into beverages shown and/or described herein. In select embodiments, the method of making a device for infusing smoke flavor into beverages may include: providing a board having a board thickness; cutting at least one recessed smoking well into a top surface of the board; creating an infuser housing inside the board, the infuser housing is configured for housing an infuser therein on a bottom of the board, the infuser is configured to create smoke, the infuser including a fan configured to direct the smoke created, the infuser housing created including an infuser cutout portion from the bottom of the board through the thickness of the board to a top surface of the board, the infuser cutout portion is sized and configured to contain the infuser, and a recessed wire area adjacent to the infuser cutout portion; wiring the infuser to a switch on the top surface of the board; connecting tubing between the infuser and the recessed smoking well; wherein, once lit, the infuser is configured to direct smoke it creates through the tubing and into the recessed smoking well; and wherein, the device made is configured to infuse smoke flavor into a glass containing the beverage positioned in the recessed smoking well by directing smoke created from the infuser through the tubing and into the recessed smoking well.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-21, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Figure 1:
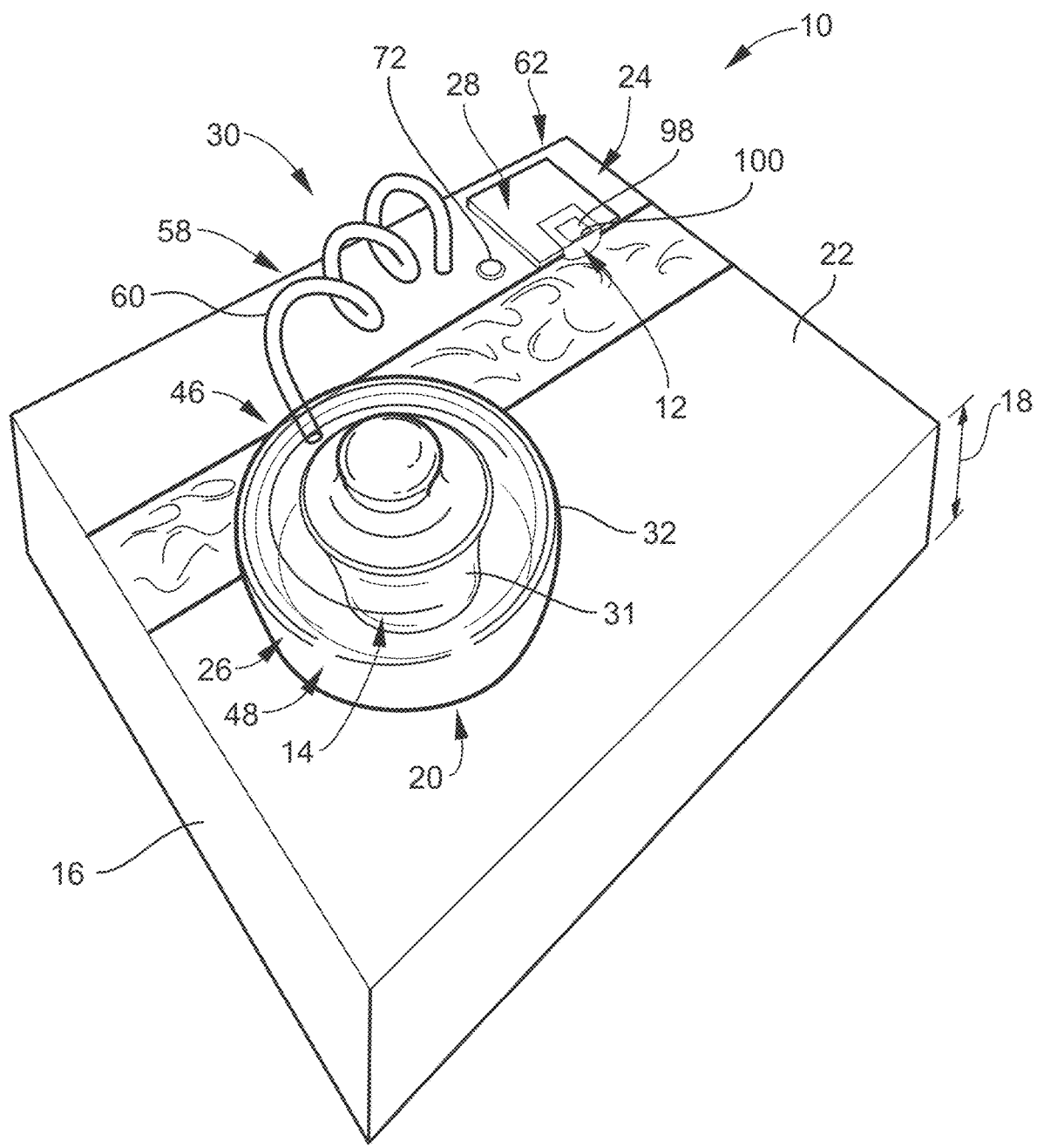
FIG. 1 is a perspective view of the device for infusing smoke flavor into beverages according to select embodiments of the instant disclosure, where a glass cloche is used to cover the recessed smoking well to capture smoke, where a glass of the beverage sits inside the recessed larger circle under the glass cloche.

Referring now to FIGS. 1-18, the present disclosure may solve the aforementioned limitations of the currently available cocktail smokers by providing device 10 for infusing smoke flavor 12 into beverages 14 (see FIG. 1). Device 10 for infusing smoke flavors 12 into beverages 14 may generally include board 16, at least one recessed smoking well 20, an infuser 24 and tubing 30. Board 16 may be any desired material, including any decorative wood (as shown in the Figures) or other desired material configured for device 10. Board 16 may have board thickness 18. Board thickness 18 may be thick enough to support device 10 with recessed smoking well 20 therein, or multiple recessed smoking wells 20 therein. The at least one recessed smoking well 20 may be recessed into top surface 22 of board 16. Infuser 24 may be housed inside of board 16, as shown in the Figures. However, the disclosure is not so limited, and infuser 24 may be positioned on or around board 16, as desired. Infuser 24 may be configured to create smoke 26 for providing smoke flavor 12. Infuser 24 may include fan 28 configured to direct smoke 26 created by infuser 24 out of infuser 24 and into recessed smoking well 20, or multiple recessed smoking wells 20. Tubing 30 may be included to connect infuser 24 to each of the recessed smoking wells 20. Wherein, once lit, infuser 24 may be configured to direct smoke 26 it creates through tubing 30 and into each of the recessed smoking wells 20. Whereby, device 10 may be configured to infuse smoke flavor 12 from smoke 26 into glass 31 containing beverage 14 positioned in recessed smoking well 20 by directing smoke 26 created from infuser 24 through tubing 30 and into recessed smoking well 20.

Beverage 14 may be any desired beverage for flavoring with smoke flavor 12, including, but not limited to, any alcoholic beverages or cocktails, like whiskey or bourbon. In addition, smoke flavor 12 created from smoke 26 in infuser 24 may be any desired smoke flavor, or created from any desired flavor material 100, like any woods, spices, fruits, nuts, the like, etc.

Figure 2:
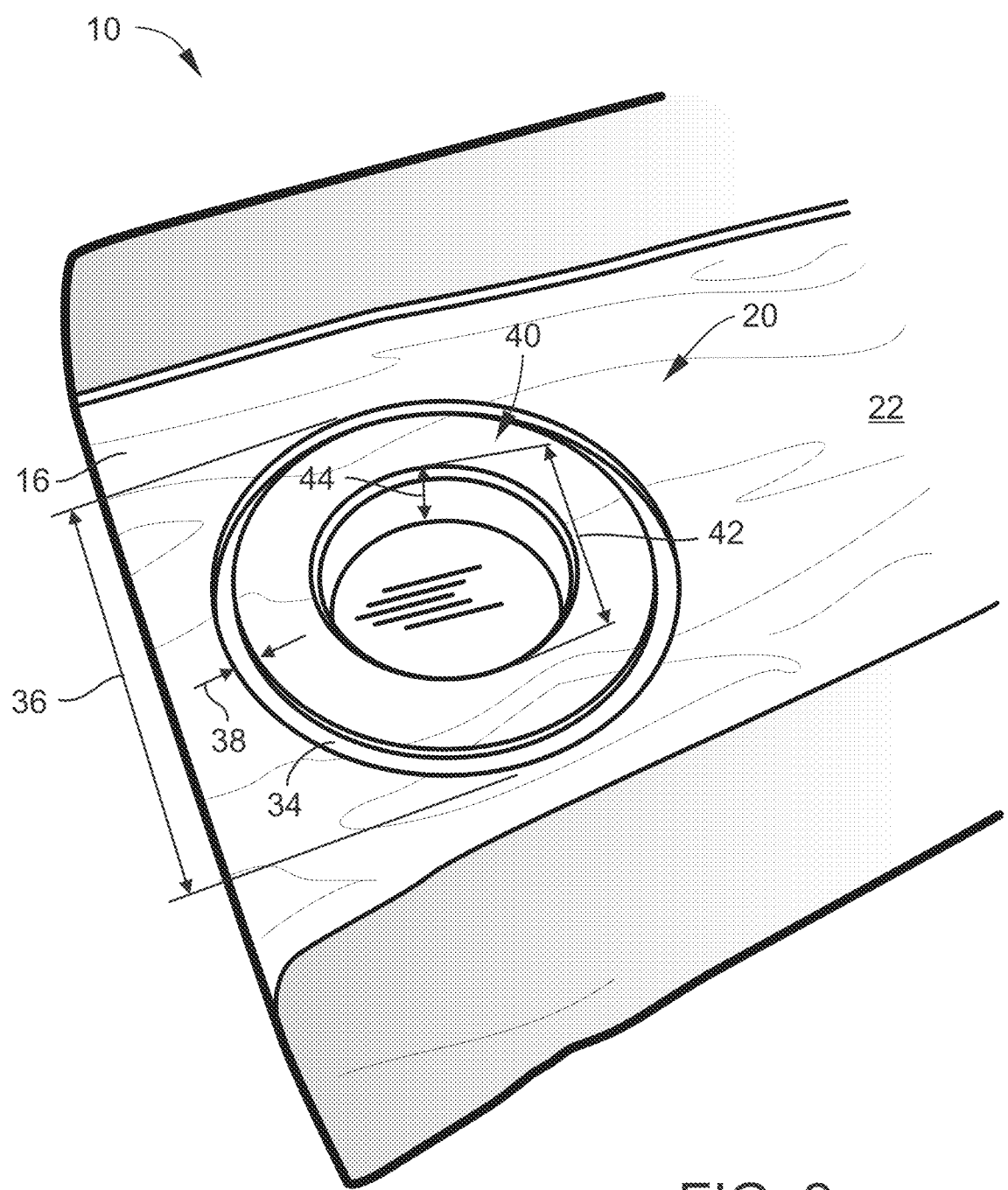
FIG. 2 is a zoomed in perspective view of the recessed smoking well of the device for infusing smoke flavor into beverages of FIG. 1, where the recessed smoking well may include a 3⅝" glass hole for the glass recessed in the board with a 6.5-inch cloche ring recessed for the cloche.
Figure 3:
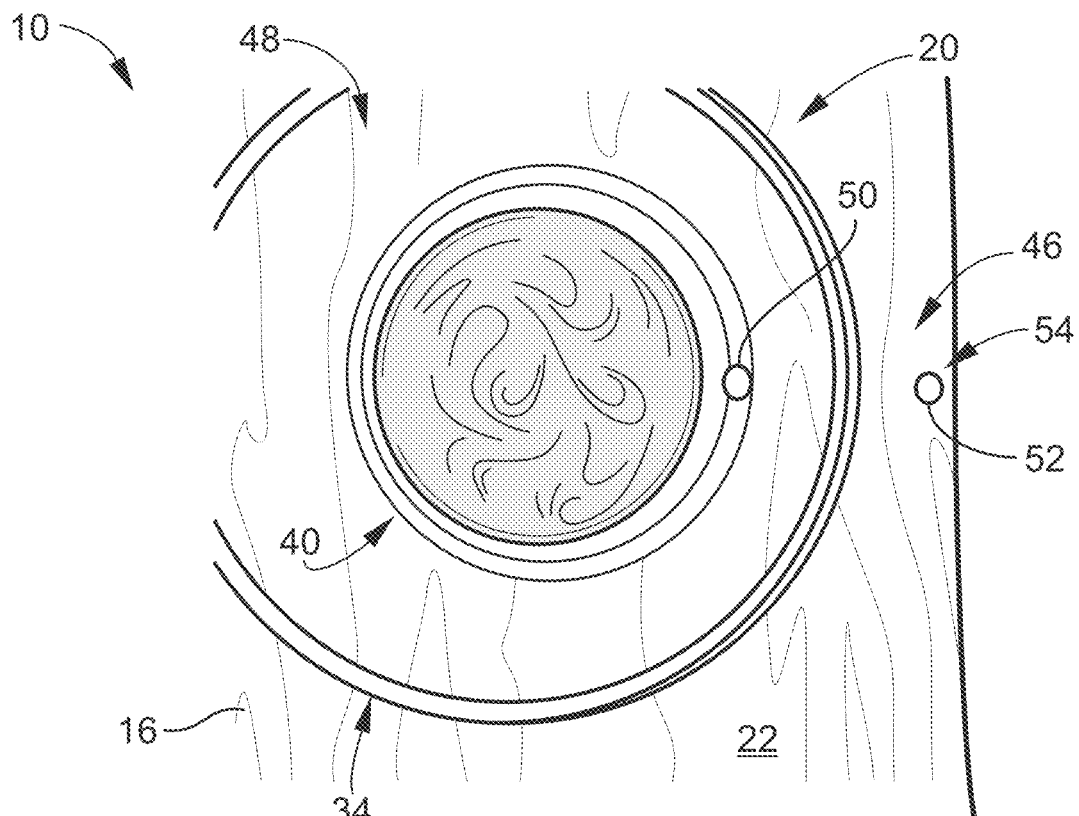
FIG. 3 is a zoomed in top view of the recessed smoking well of the device for infusing smoke flavor into beverages of FIG. 1, showing the smoke holes connected from the top of the board to the inside of the recessed smoking well through the glass hole, where the smoking holes may be ⅜ inch holes, one drilled horizontally from the recessed smoking well, and another drilled at an angle from the top of the board to meet the horizontal hole from the recessed smoking well.
Figure 4:
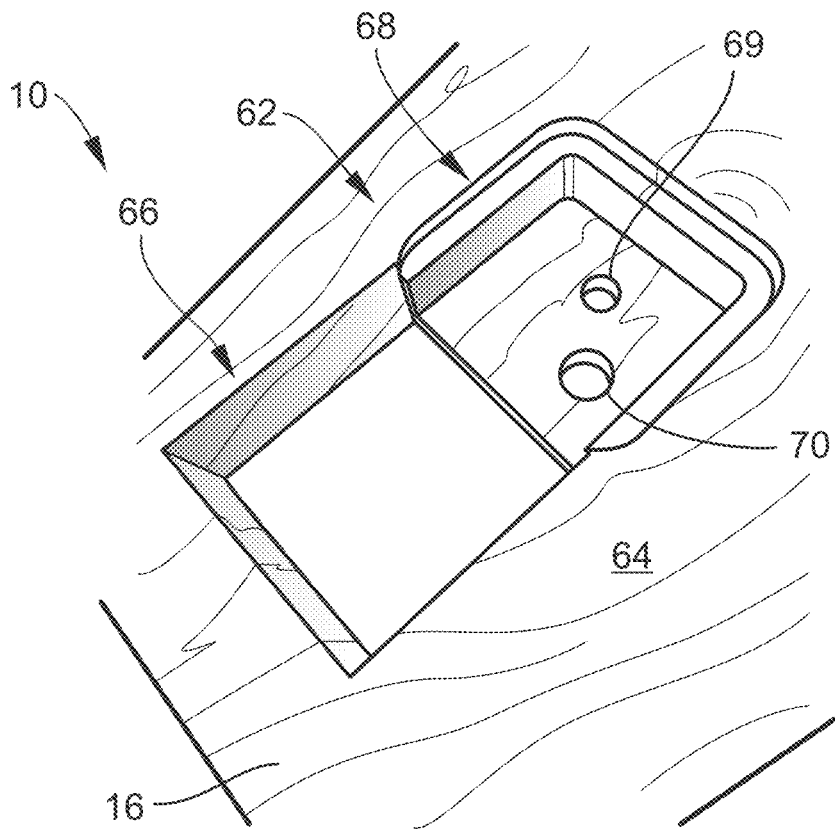
FIG. 4 is a zoomed in perspective view of the infuser housing on the bottom of the board of the device for infusing smoke flavor into beverages of FIG. 1, where the infuser housing may include a infuser cutout portion (like a 3 9/16" square cut from the bottom of the board) to house the infuser, and a recessed wire area beside the infuser cutout portion to house the wiring.
Figure 5:
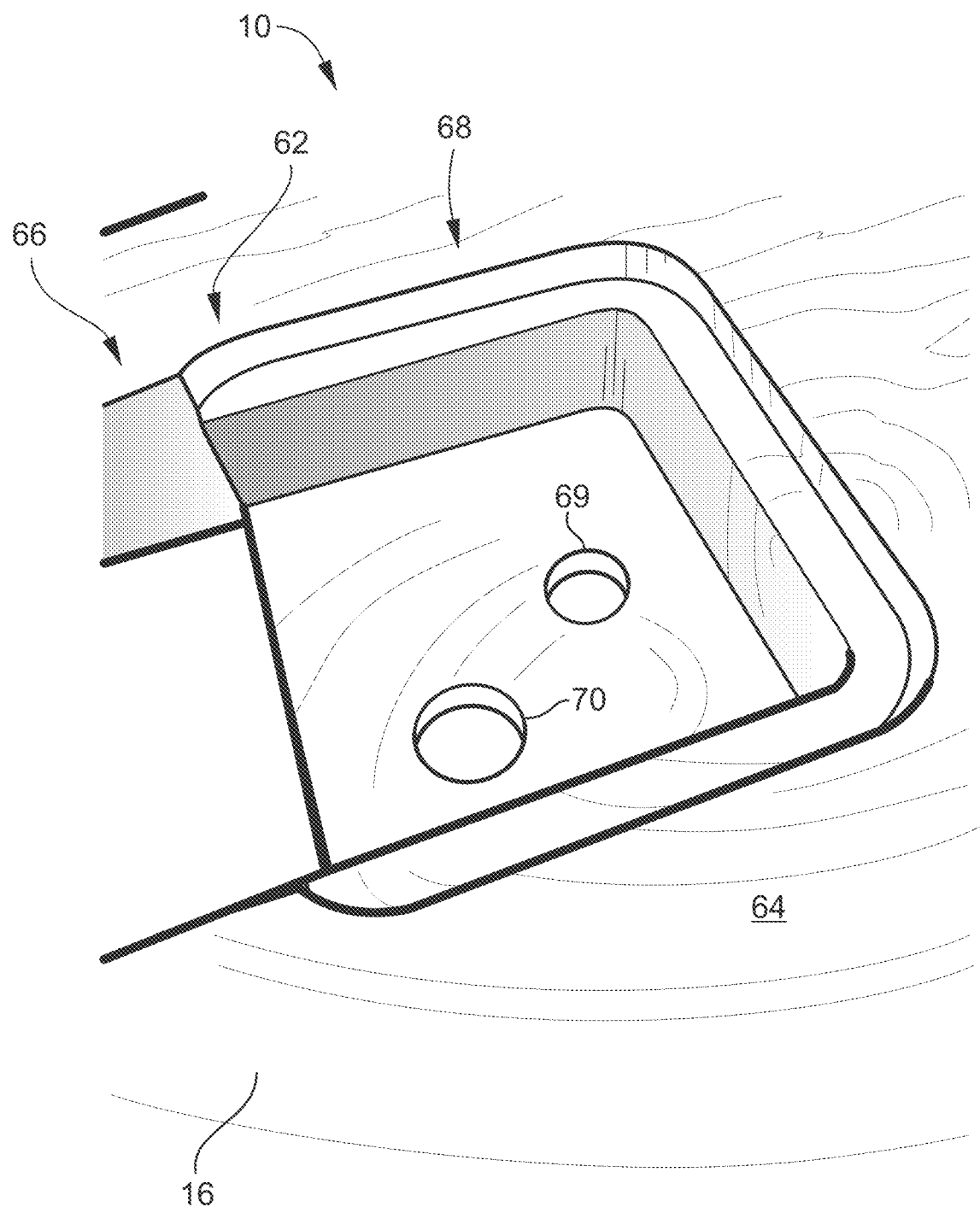
FIG. 5 is another zoomed in perspective view of the recessed wire area of the infuser housing on the bottom of the board of the device for infusing smoke flavor into beverages of FIG. 1 showing that the recessed wire area has a tubing hole (like a 9/16" hole) configured for the tubing to route the smoke, and a switch hole (like a ¾" hole) to hold the switch that activates the infuser.
Figure 6:
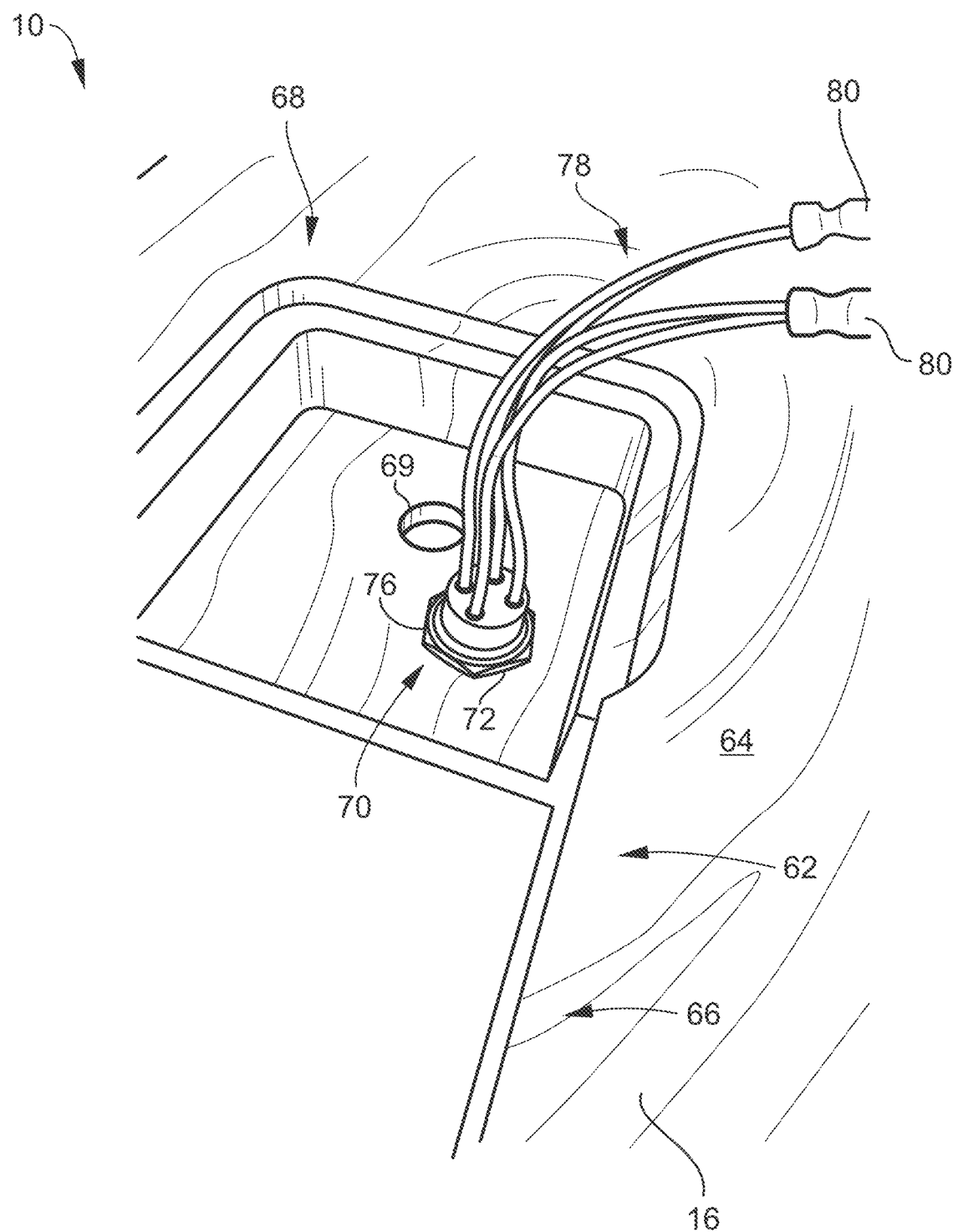
FIG. 6 is another zoomed in perspective view of the recessed wire area of the infuser housing on the bottom of the board of the device for infusing smoke flavor into beverages of FIG. 1 showing the switch installed with a locking nut into the switch hole.
Figure 7:
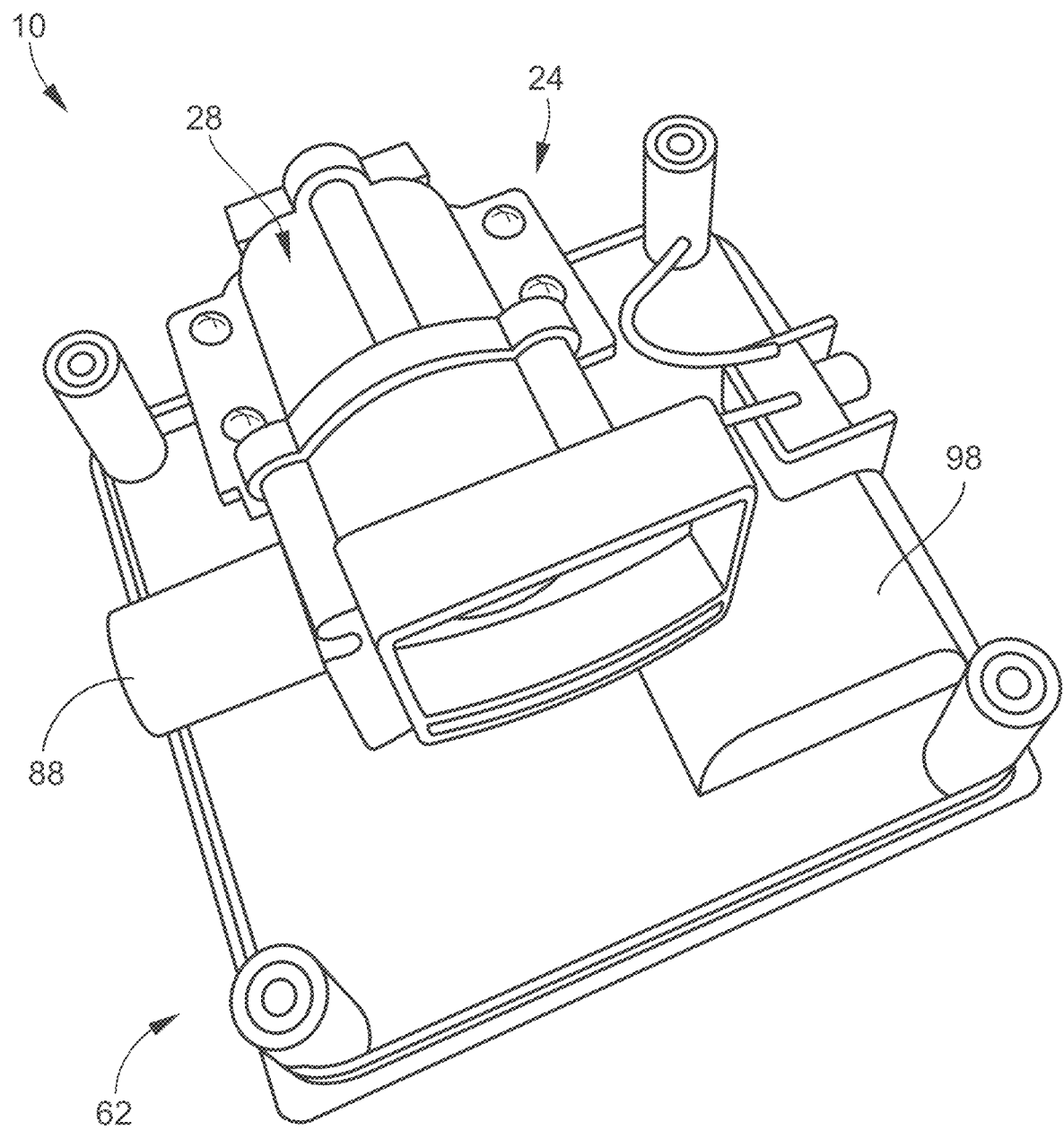
FIG. 7 is a partially disassembled perspective view of the infuser of the device for infusing smoke flavor into beverages of FIG. 1.
Figure 8:
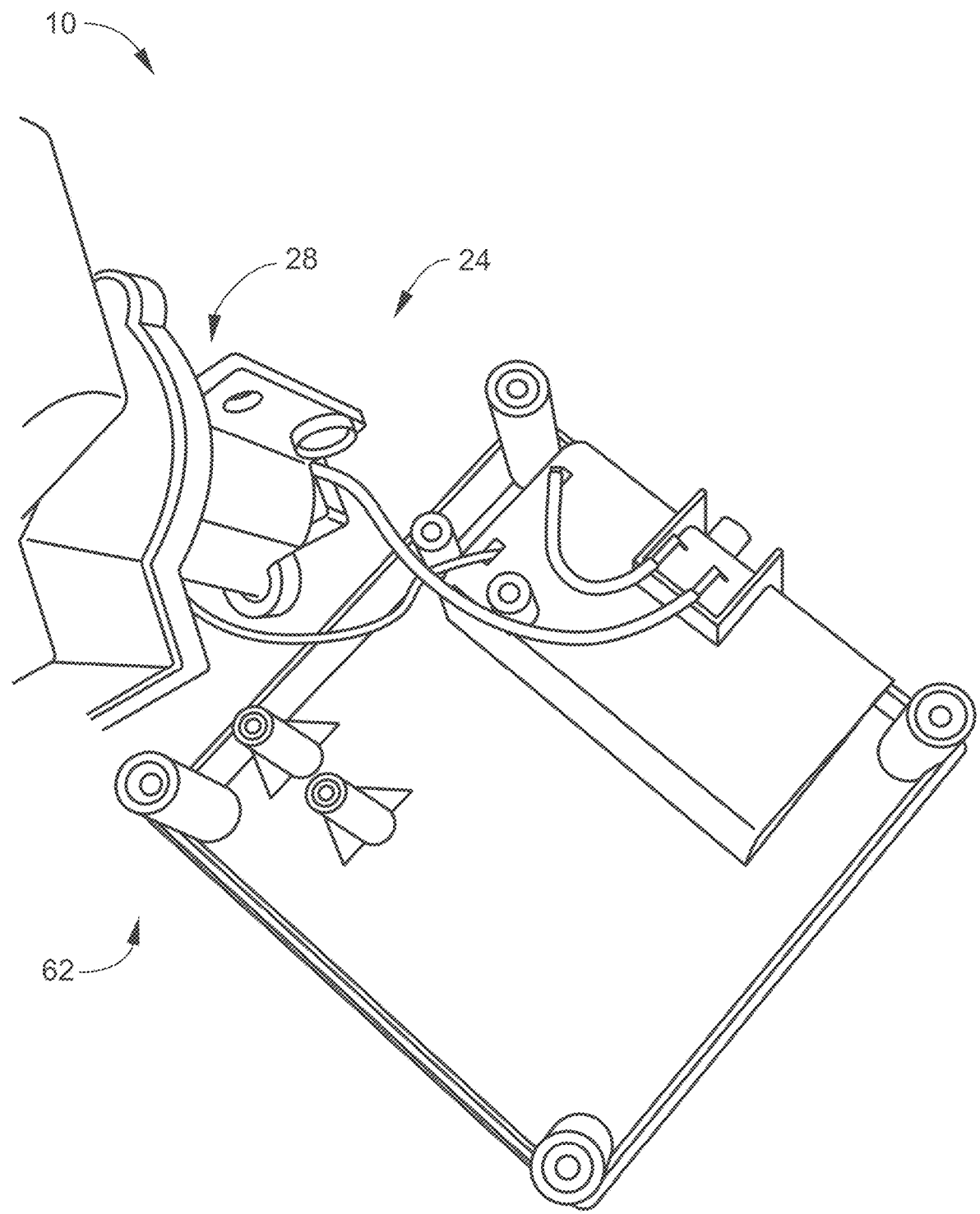
FIG. 8 is a partially disassembled perspective view of the infuser of the device for infusing smoke flavor into beverages of FIG. 1 showing the wiring cut and infuser switch removed.
Figure 9:
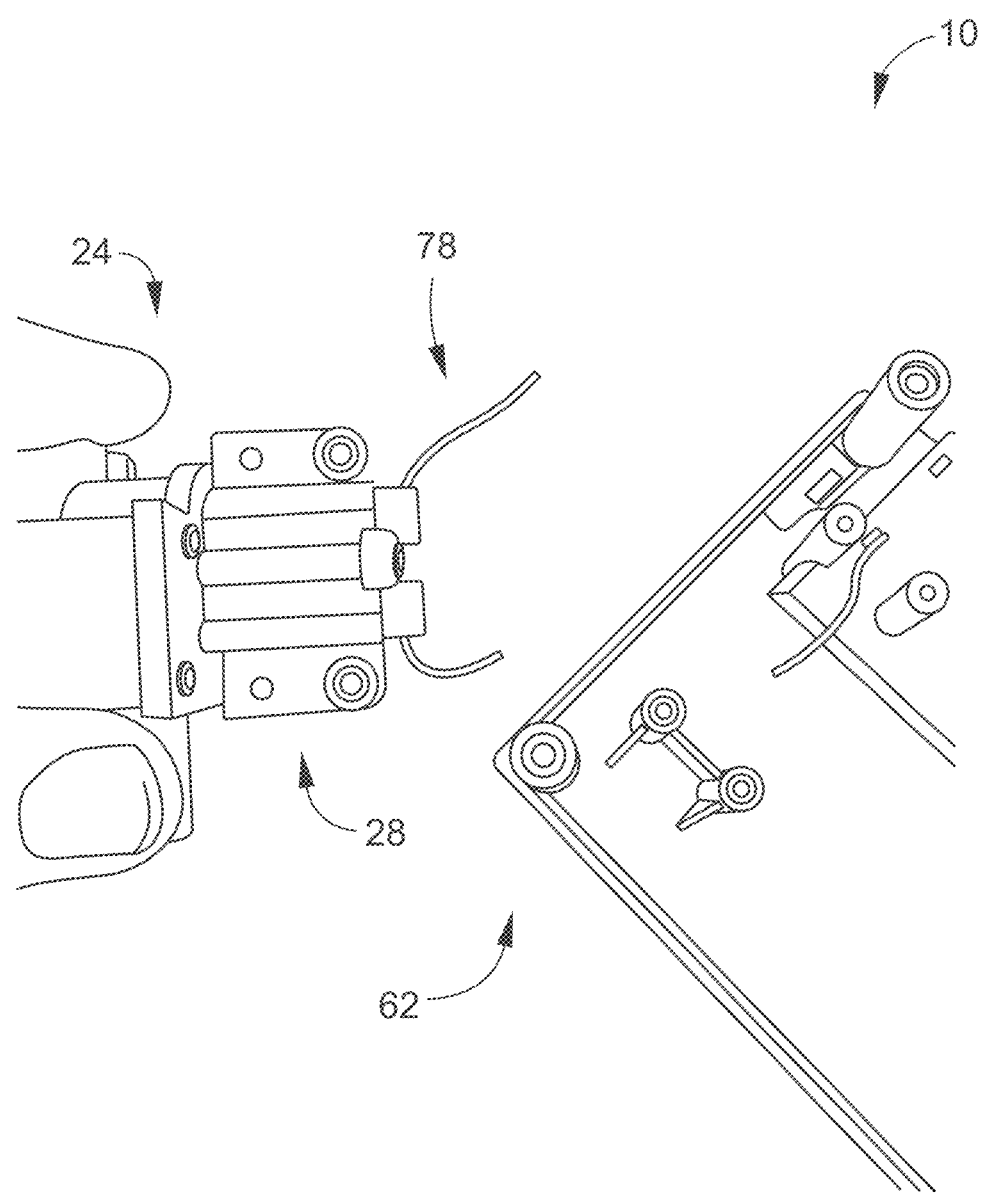
FIG. 9 is a partially disassembled perspective view of the infuser of the device for infusing smoke flavor into beverages of FIG. 1 showing the wiring to the motor/fan cut.
Figure 10:
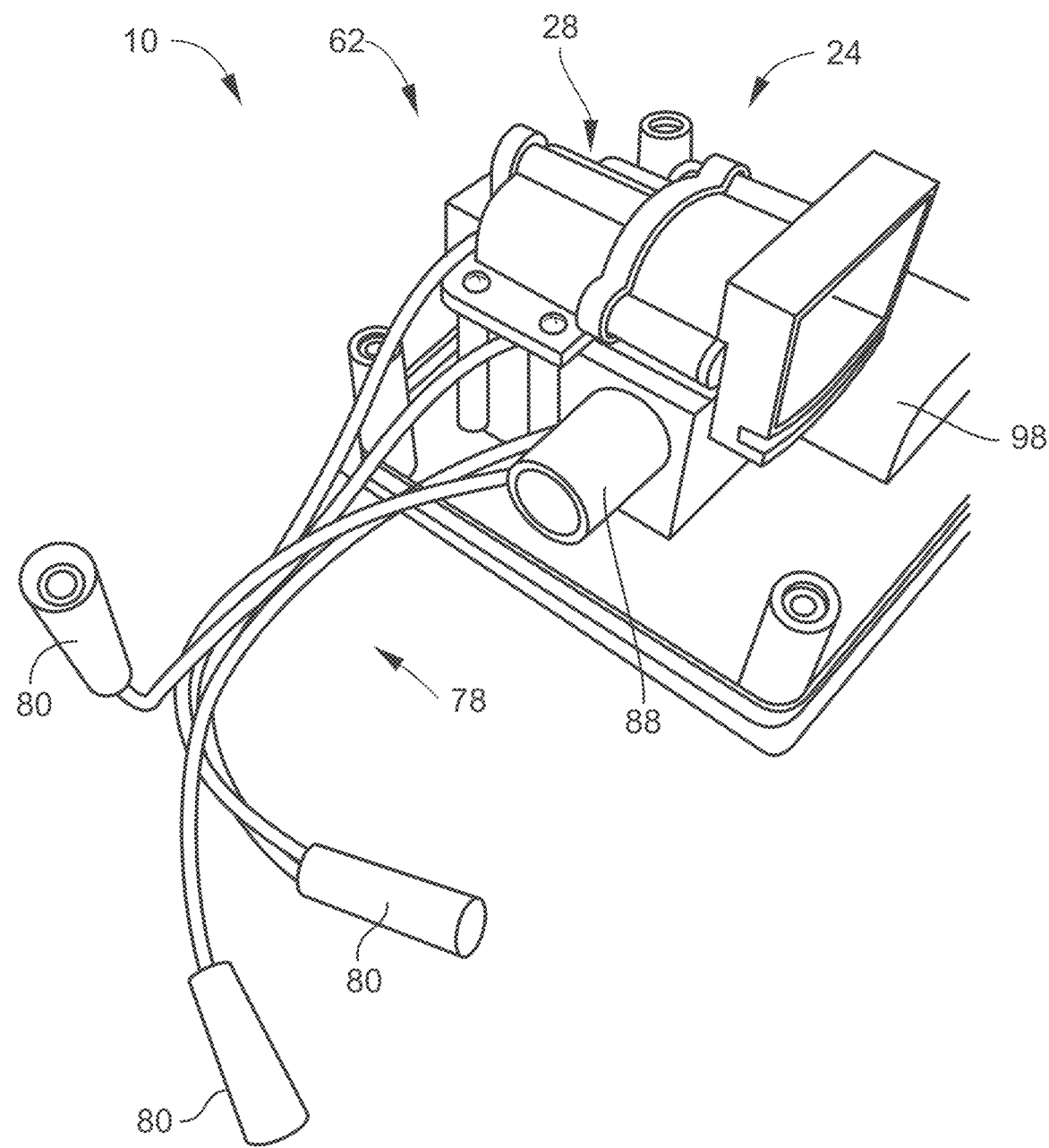
FIG. 10 is a partially disassembled perspective view of the infuser of the device for infusing smoke flavor into beverages of FIG. 1 showing the motor reassembled with new wiring soldered in and bullet connectors to attach to the pushbutton switch.
Figure 11:
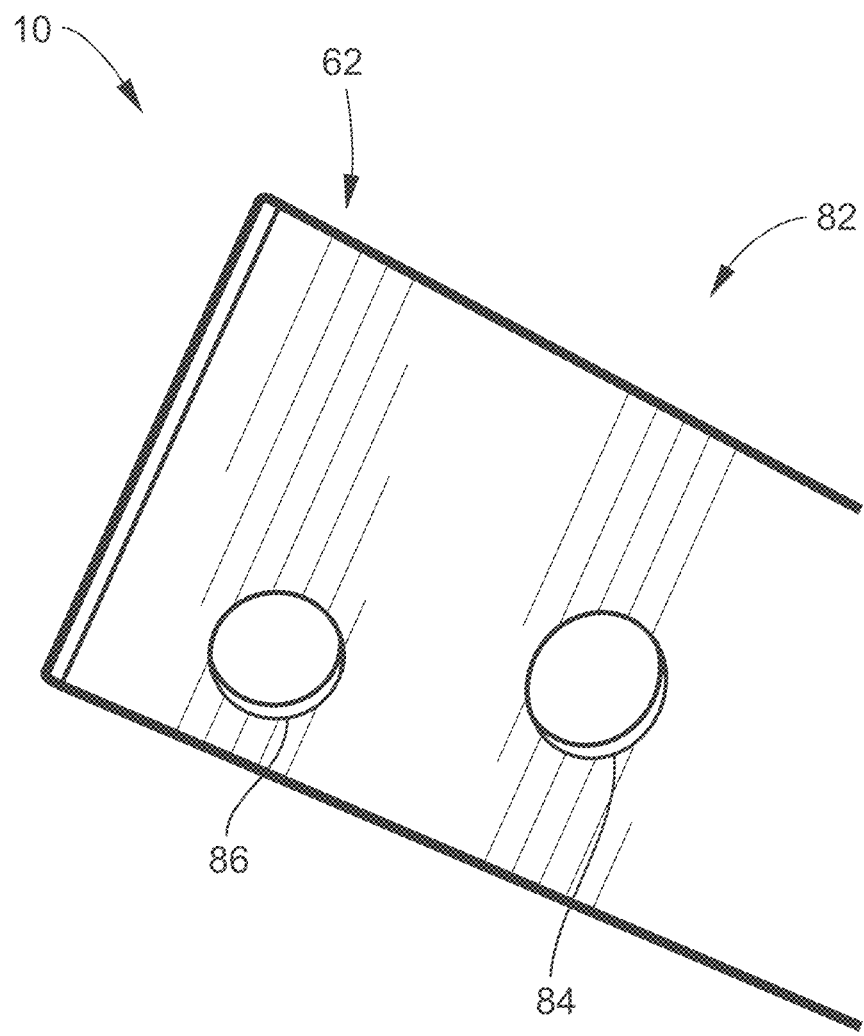
FIG. 11 is a zoomed in view of the drilled holes to route new wiring into recessed area of the infuser of the device for infusing smoke flavor into beverages of FIG. 1.

As shown in FIG. 1, in select embodiments of device 10 for infusing smoke flavor 12 into beverages 14, recessed smoking well 20 may include cloche 32. Cloche 32 may be designed for covering recessed smoking well 20 for sealing in smoke 26 directed therein. Cloche 32 may be any device or means for covering recessed smoking well 20 for sealing in smoke 26 directed therein. As such cloche 32 may be configured to cover recessed smoking well 20 for holding smoke 26 inside of recessed smoking well 20 for better infusion into beverage 14 held in glass 31 therein. In select embodiments, as best shown in FIGS. 1-3, recessed smoking well 20 may include outer recessed cloche ring 34 configured to receive cloche 32 therein. Outer recessed cloche ring 34 may have cloche diameter 36 and ring thickness 38 (see FIG. 2). Cloche diameter 36 and ring thickness 38 may be sized and configured to receive any size or shape cloche 32 into outer recessed cloche ring 34.

Still referring to FIGS. 1-3, another feature of device 10 for infusing smoke flavor 12 into beverages 14 may be that recessed smoking well 20 may further include recessed glass hole 40. Recessed glass hole 40 may be configured to recess glass 31 containing beverage 14 into thickness 18 of board 16. Recessed glass hole 40 may include glass diameter 42 and depth 44 (see FIG. 2). Glass diameter 42 and depth 44 may be sized, shaped, and configured to position and maintain glass 31 inside of recessed smoking well 20.

Figure 18:
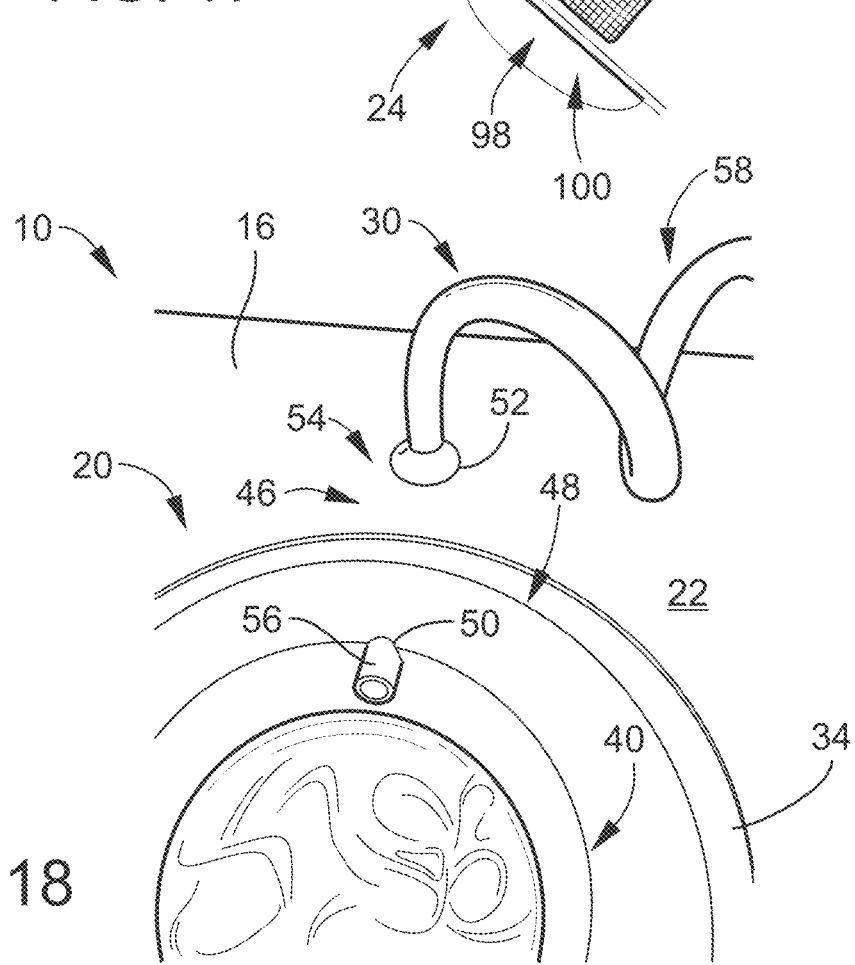
FIG. 18 is a zoomed in top view of the smoke tubing on the top of the board for the device for infusing smoke flavor into beverages of FIG. 1 showing the smoke stub inserted into the hole of the recessed smoking well.
Figure 19:
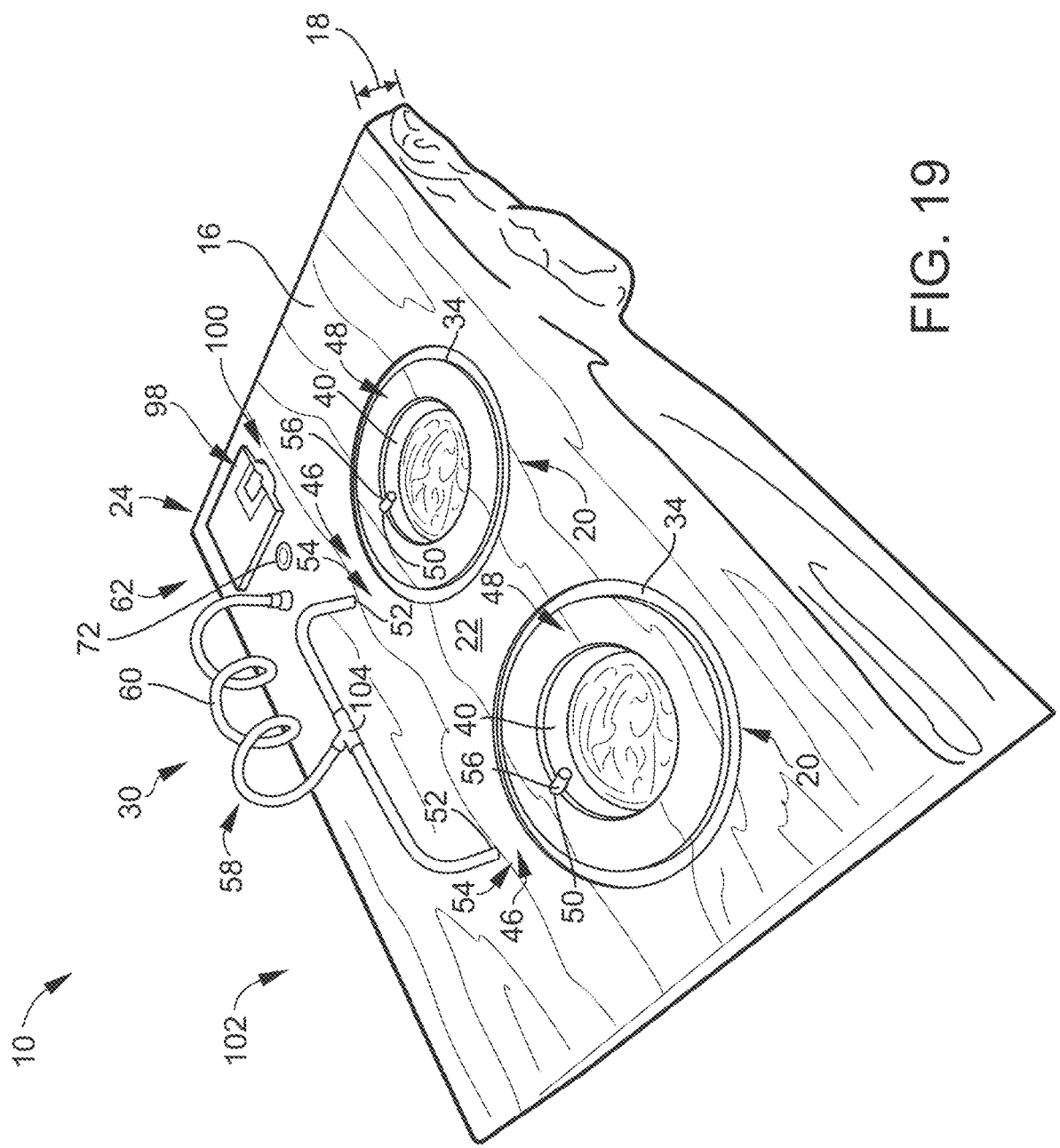
FIG. 19 is a perspective view of a double embodiment of the device for infusing smoke flavor into beverages according to select embodiments of the instant disclosure with two (2) recessed smoking wells on the same board, with a T-connector splitting the smoke tubing into the two (2) recessed smoking wells.

As best shown in FIGS. 3 and 18, another feature of device 10 for infusing smoke flavor 12 into beverages 14 may be that in select embodiments recessed smoking well 20 may further include smoke passageway 46. Smoke passageway 46 may be for introducing smoke into recessed smoking well 20 under cloche 32. As such, smoke passageway 46 may be created under outer recessed cloche ring 34 of recessed smoking well 20. Smoke passageway 46 may interconnect top surface 22 of board 16 to inside 48 of recessed smoking well 20. In select embodiments, smoke passageway 46 may include first smoke hole 50 and second smoke hole 52. First smoke hole 50 may be horizontally drilled from recessed glass hole 40 in recessed smoking well 20. Second smoke hole 52 may be vertically drilled from top surface 22 of board 16 to connect with second smoke hole 52. In select embodiments, second smoke hole 52 may be drilled or created at angle 54 to connect with first smoke hole 50. As such, first smoke hole 50 may be connected to second smoke hole 52 for introducing smoke 26 into recessed smoking well 20 under cloche 32. Wherein, tubing 30 from infuser 24 may be connected to second smoke hole 52 for directing smoke 26 created from infuser 24 through second smoke hole 52, through smoke passageway 46 and out of first smoke hole 50 into recessed smoking well 20. Referring to FIGS. 18 and 19, in select embodiments of device 10, second smoke hole 52 may include stub 56. Stub 56 may be connected to second smoke hole 52 for directing smoke 26 created from infuser 24 further into recessed smoking well 20. Stub 56 may be made from any material, including, but not limited to, copper tubing to match tubing 30.

Referring now to FIGS. 1, 17, 18 and 19, another feature of device 10 for infusing smoke flavor 12 into beverages 14 may be that tubing 30 can include spiraled portion 58. Spiraled portion 58 may be between infuser 24 and recessed smoking well 20. Spiraled portion 58 of tubing 30 may be configured to extend length 60 of tubing 30 between infuser 24 and recessed smoking well 20. Tubing 30, with spiraled portion 58, may be any size, shape and/or material of tubing. As an example, and clearly not limited thereto, tubing 30 may be copper tubing. The copper tubing for tubing 30 may be, but is not limited to, ⅜" outside diameter tubing with ¼" inside diameter.

Referring now specifically to FIGS. 4-17, another feature of device 10 for infusing smoke flavor 12 into beverages 14 may be that board 16 can further include infuser housing 62. Infuser housing 62 may be designed and configured in and/or around board 16 for housing or positioning infuser 24 in and/or around board 16. Infuser housing 62 may include any design, shape, or size of housing for any desired design, shape and/or size of infuser 24 used with device 10. As an example, and clearly not limited thereto, as shown in the Figures, infuser housing 62 may be designed to hold a Smoking Gun Model P00272 from Wancle Corporation of China. This Smoking Gun Model P00272 may be utilized for its infuser and smoking box and may be modified by removing the gun nozzle and hooking the outlet of the infuser box and smoking box to tubing 30, and may be rewired to switch 72, as shown in FIGS. 6-14. In select embodiments, as shown in the Figures, infuser housing 62 may be configured for housing infuser 24 in board 16. Infuser housing 62 may house infuser 24 on bottom 64 of board 16. In select embodiments, infuser housing 62 can include infuser cutout portion 66 and recessed wire area 68. Infuser cutout portion 66 may be from bottom 64 of board 16 through thickness 18 of board 16 to top surface 22 of board 16. In other words, infuser cutout portion 66 may be completely through board 16. Infuser cutout portion 66 may be sized and configured to contain infuser 24 in board 16, including frame 82 of infuser 24. Recessed wire area 68 may be adjacent to infuser cutout portion 66. Recessed wiring area may be a recessed area on bottom 64 of board 16 for containing wiring 78 between infuser 24 and switch 72. In select embodiments, recessed wire area 68 may include tubing hole 69 and switch hole 70. Tubing hole 69 may be cut through to top surface 22 of board 16. Tubing hole 69 may be configured to receive tubing 30 therethrough. Switch hole 70 may be cut through to top surface 22 of board 16. Switch hole 70 may be configured to hold switch 72 for infuser 24. Switch 72 may be configured to activate or power on and off infuser 24. In select embodiments, as shown in the Figures, switch 72 may be a bush button style switch. In select embodiments, switch 72 of infuser 24 may be installed into switch hole 70 via locking nut 76. Referring now specifically to FIG. 15, cover 74 may also be included with recessed wire area 68. Cover 74 may be removably attached to recessed wire area 68. Cover 74 for recessed wire area 68 may be configured to conceal recessed wire area 68 while in bottom 64 of board 16, like via screws or the like, and may be removed for accessing wiring 78 of infuser 24.

As shown in FIGS. 6-10 and 12-14, another feature of device 10 for infusing smoke flavor 12 into beverages 14 may be that infuser 24 can include wiring 78. Wiring 78 may be for connecting infuser 24 with fan 28 to switch 72. As such, wiring 78 may be connected between switch 72 in recessed wire area 68 and fan 28 of infuser 24 in infuser cutout portion 66. In select embodiments, wiring 78 may include bullet connectors 80 (or the like) for connecting wiring 78 between switch 72 in recessed wire area 68 and infuser 24.

Referring now to FIGS. 11-16, another feature of device 10 for infusing smoke flavor 12 into beverages 14 may be that infuser 24 can include frame 82. Frame may be configured to surround and protect infuser 24 in infuser housing 62. In select embodiments, frame 82 can include first frame hole 84 and second frame hole 86 (see FIGS. 11 and 14). First frame hole 84 may be configured to receive wiring 78 therethrough for connecting wiring between switch 72 in recessed wire area 68 and fan 28 of infuser 24 in infuser cutout portion 66. Second fame hole 86 may be configured to receive tubing 30 therethrough for connecting tubing 30 to outlet 88 of infuser 24. Wherein, in select embodiments, frame 82 may be glued in positioned in infuser cutout portion 66 for positioning and securing infuser 24 inside board 16.

Figure 12:
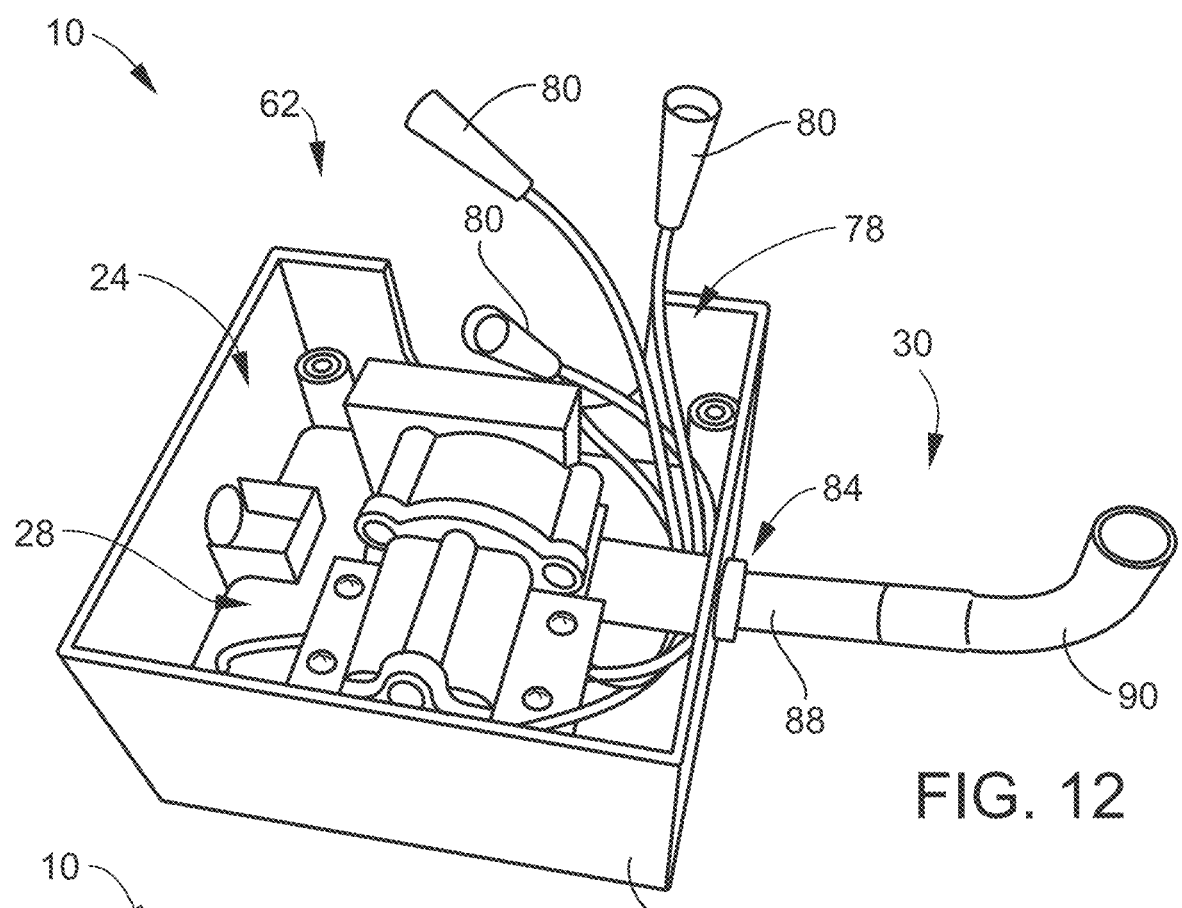
FIG. 12 is a partially disassembled perspective view of the infuser of the device for infusing smoke flavor into beverages of FIG. 1 showing the infuser reassembled and smoke outlet adapted to affix the 90-degree elbow (like a copper elbow)
Figure 13:
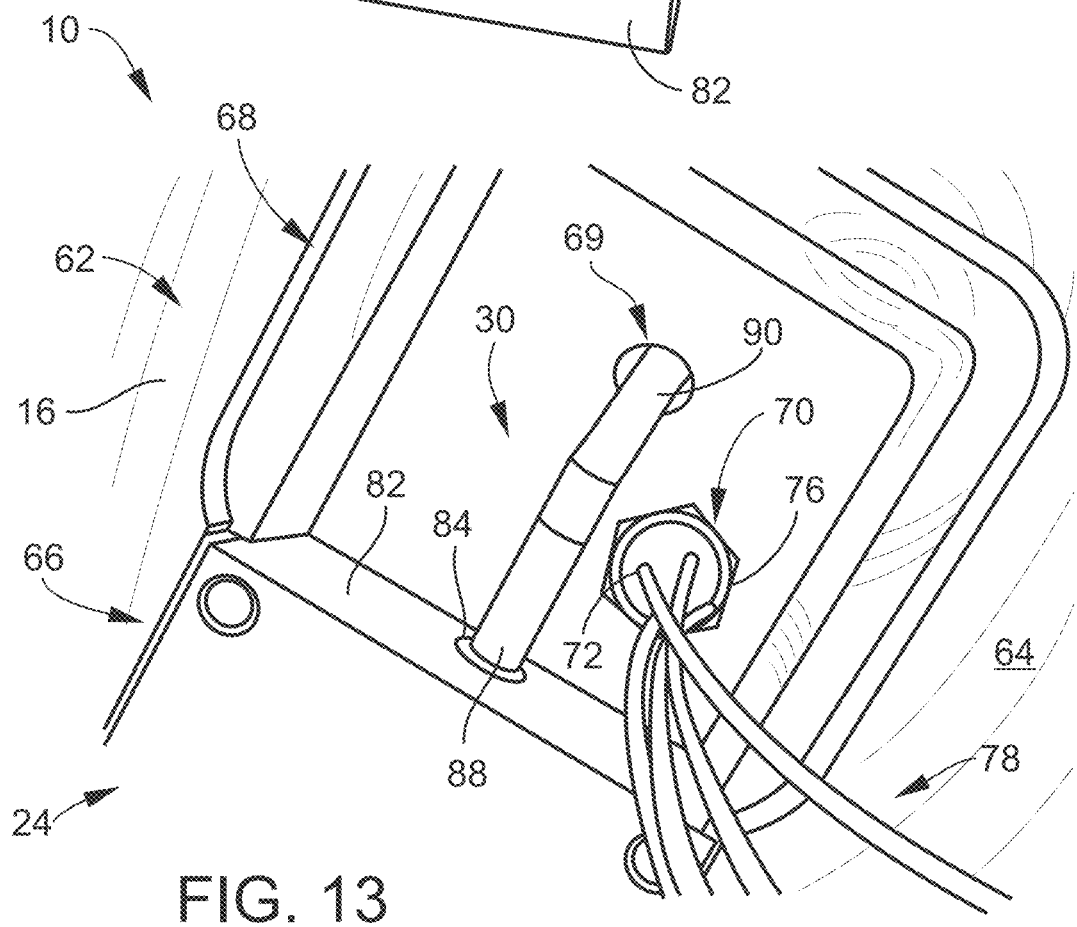
FIG. 13 is a partially disassembled perspective view of the infuser of the device for infusing smoke flavor into beverages of FIG. 1 showing the infuser inserted into square cutout of infuser housing and glued into place with 90-degree elbow protruding from the top of the board.
Figure 14:
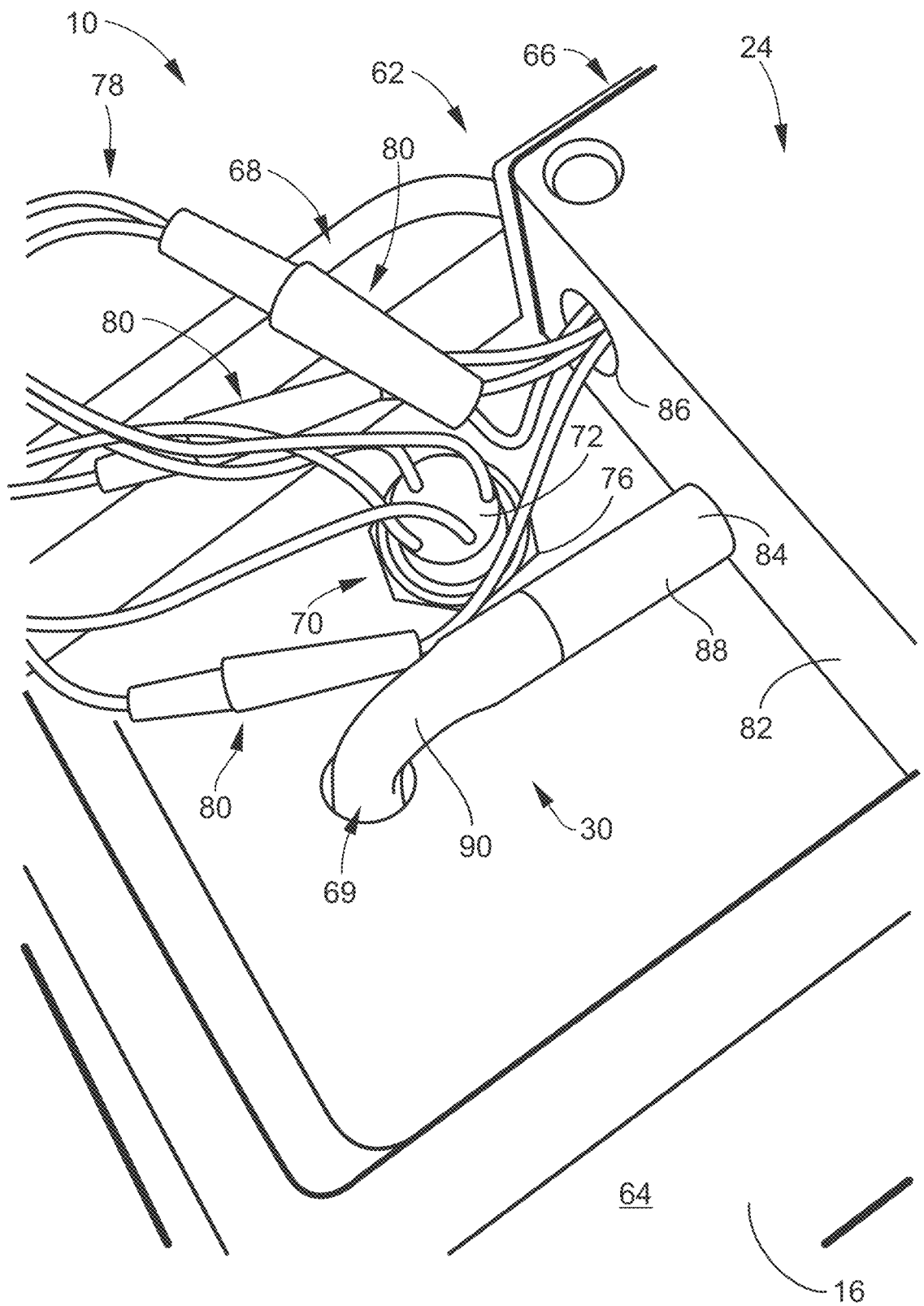
FIG. 14 is a partially disassembled perspective view of the infuser of the device for infusing smoke flavor into beverages of FIG. 1 showing wiring from the infuser routed through wiring hole and connected to switch.
Figure 15:
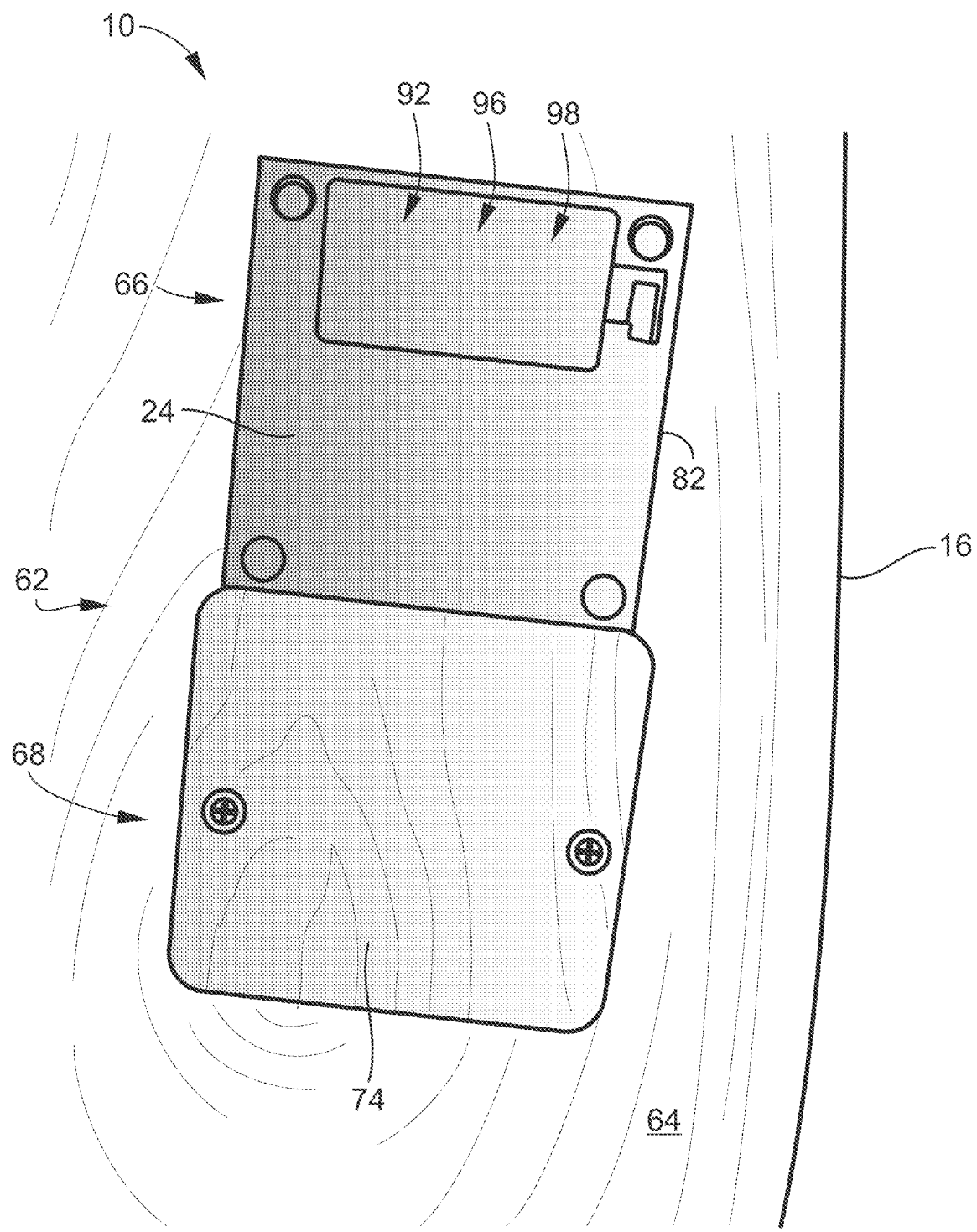
FIG. 15 is a zoomed in bottom view of the infuser housing on the bottom of the board for the device for infusing smoke flavor into beverages of FIG. 1 showing the wooden cover fabricated and attached to lip around the recess with screws.
Figure 16:
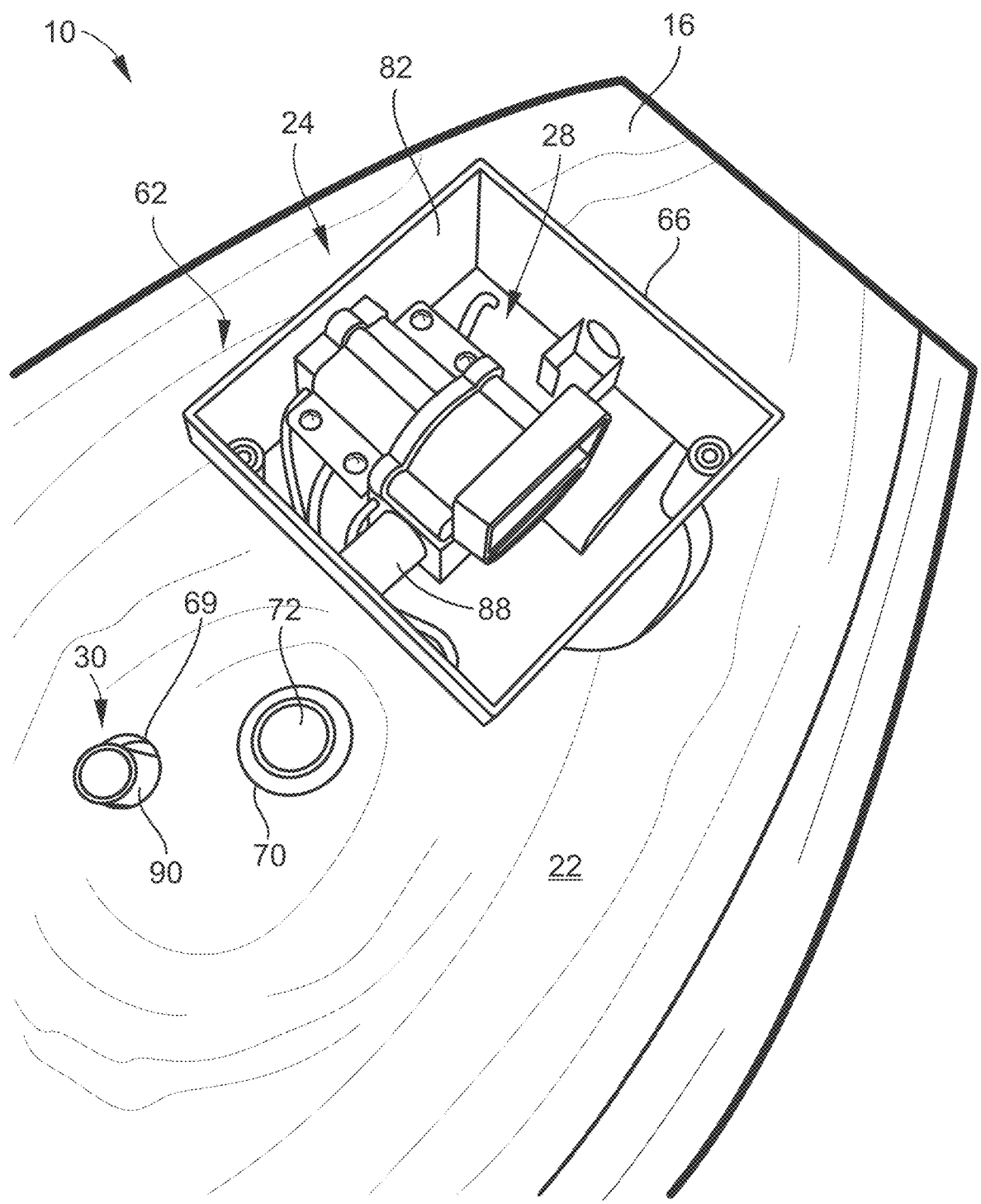
FIG. 16 is a zoomed in top view of the infuser housing on the bottom of the board for the device for infusing smoke flavor into beverages of FIG. 1 showing the infuser mounted with switch and outlet from the top of the board.
Figure 17:
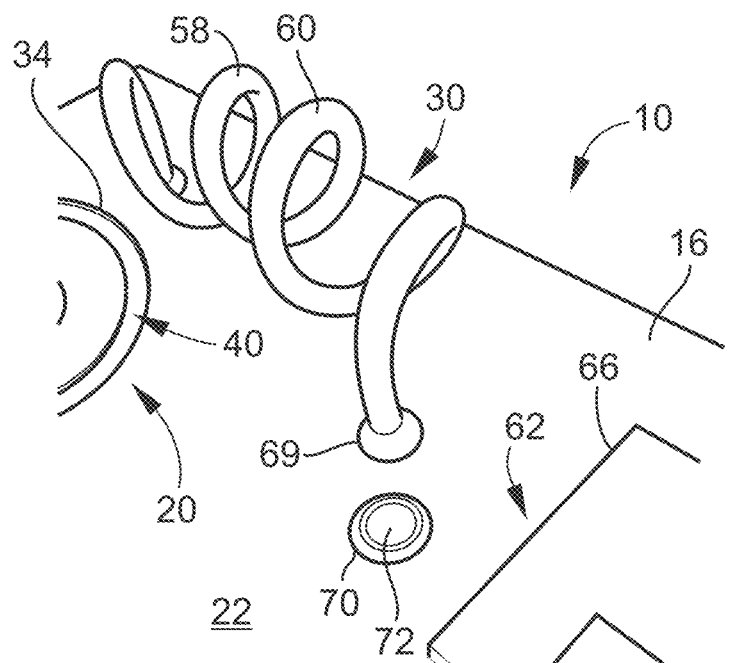
FIG. 17 is a zoomed in top view of the smoke tubing on the top of the board for the device for infusing smoke flavor into beverages of FIG. 1 showing spiral tubing (like copper) glued into the 90-degree elbow and inserted into the vertical hole located at the recessed smoking well.

Referring now to FIGS. 12-14, another feature of device 10 for infusing smoke flavor 12 into beverages 14 may be that tubing 30 may include elbow connection 90. Elbow connection 90 may be in recessed wiring area 68. Elbow connection 90 may be configured to connect outlet 88 of infuser 24 with tubing 30 through second frame hole 86.

Elbow connection 90 thus may provide a 90-degree bend of tubing 30 between outlet 88 of infuser 24 and top surface 22 of board 16. Elbow connection 90 may be made from any desired material, including, but not limited to, copper tubing, or the like.

Referring now specifically to FIG. 15, another feature of device 10 for infusing smoke flavor 12 into beverages 14 may be that infuser 24 with fan 28 can include power source 92. Power source 92 may be any desired source of power for running infuser 24 with fan 28. In select embodiments, power source 92 may be wired powered source 94, battery powered source 96, and/or any various combinations thereof. In possibly preferred embodiments, power source 92 may be a rechargeable battery powered source 96 for allowing device 10 to be mobile and convenient.

As best shown in FIGS. 1, 19 and 19, another feature of device 10 for infusing smoke flavor 12 into beverages 14 may be that infuser 24 can include smoke box area 98. Smoke box area may be any size, shape or configuration of a smoke box area for inserting desired flavor material 100, where it can be safely lit for creating smoke 26 therefrom. As such, smoke box area 98 may be configured for inserting and lighting desired flavor material 100 therein. Wherein, fan 28 of infuser 24 may be configured to direct smoke 26 created in smoke box area 98 with desired flavor material 100 out of outlet 88, into tubing 30 and into recessed smoking well 20 for infusing smoke flavor 12 into beverage 14 positioned in glass 31 therein.

Referring now specifically to FIG. 19, another feature device 10 for infusing smoke flavor 12 into beverages 14 may be that it can be configured as double infuser device 102. Double infuser device 102 may be designed and configured for infusing smoke flavor 12 into 2 beverages 14 simultaneously. As such, double infuser device 102 configuration may include two recessed smoking wells 20. Each of the two recessed smoking wells 20 may be recessed into top surface 22 of board 16. Wherein, tubing 30 may include T-connector 104 (or the like) for splitting tubing 30 for connecting tubing 30 to both of the two recessed smoking wells 20. Wherein, once lit, infuser 24 may be configured to direct smoke 26 it creates through tubing 30 and into each of the two recessed smoking wells 20.

In another aspect, the instant disclosure embraces device 10 for infusing smoke flavor 12 into beverages 14 in any embodiment and/or combination of embodiments shown and/or described herein.

Figure 20:
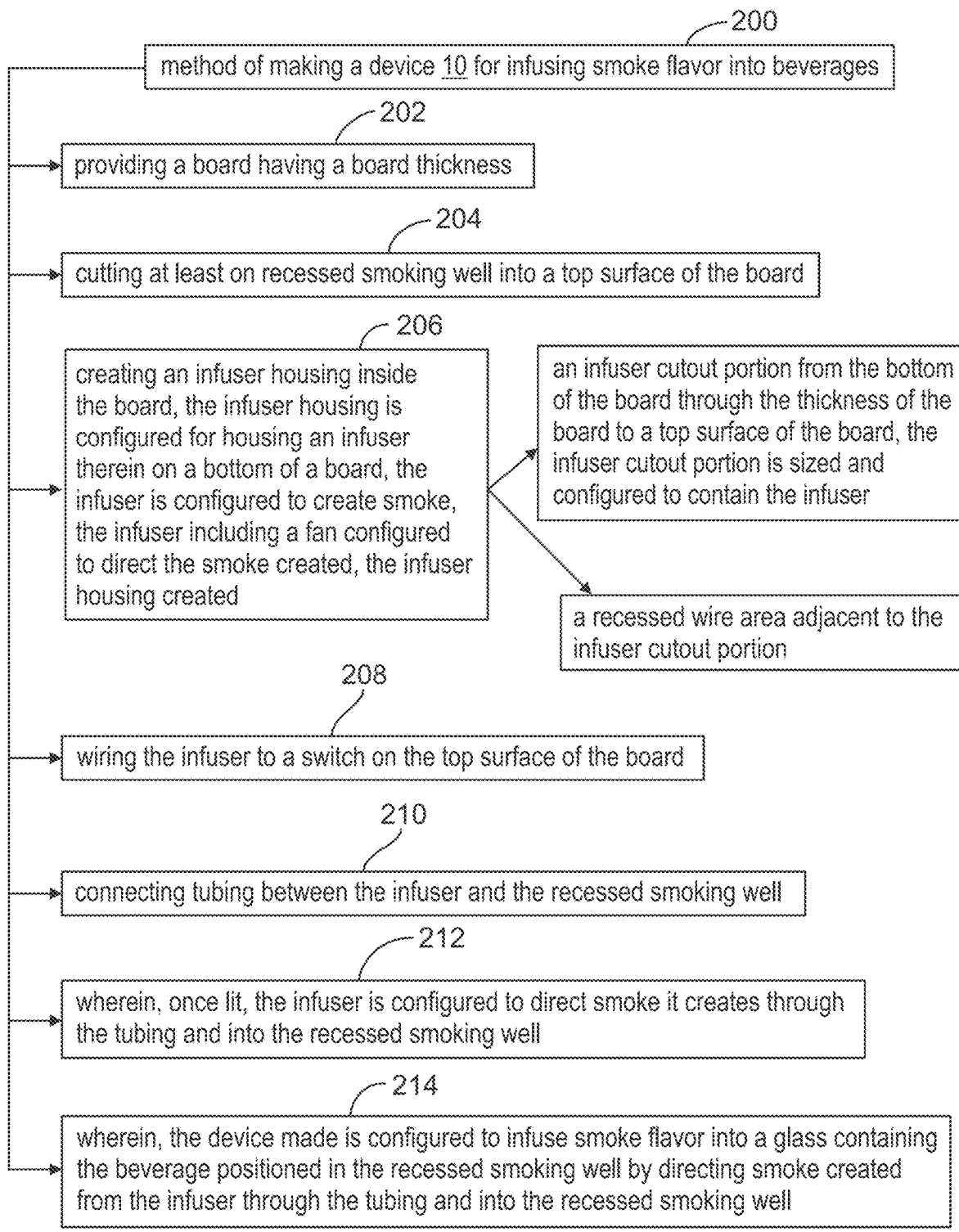
FIG. 20 is a flow diagram of the method of making a device for infusing smoke flavor into beverages according to select embodiments of the instant disclosure.

Referring now to FIG. 20, in another aspect, the instant disclosure embraces method 200 of making device 10 for infusing smoke flavor 12 into beverages 14. In general, method 2—of making device 10 for infusing smoke flavor 12 into beverages 14 may include making any embodiment and/or combination of embodiments of device 10 for infusing smoke flavor 12 into beverages 14 shown and/or described herein. In select embodiments, method 200 of making device 10 for infusing smoke flavor 12 into beverages 14 may include: step 202 of providing board 16 having board thickness 18; step 204 of cutting at least one recessed smoking well 20 into top surface 22 of board 16 (see FIG. 2); step 206 of creating infuser housing 62 (see FIG. 4) inside board 16, infuser housing 62 is configured for housing infuser 24 therein on bottom 64 of board 16, infuser 24 is configured to create smoke 26, infuser 24 including fan 28 configured to direct smoke 26 created, infuser housing 24 created including infuser cutout portion 66 from bottom 64 of board 16 through thickness 18 of board 16 to top surface 22 of board 16, infuser cutout portion 66 is sized and configured to contain infuser 24, and recessed wire area 68 adjacent to infuser cutout portion 66; step 208 of wiring infuser 24 to switch 72 on top surface 22 of board 16 (see FIGS. 6-14); step 210 of connecting tubing 30 between infuser 24 and recessed smoking well 20 (see FIGS. 1, 12-14, and 19); wherein in step 212, once lit, infuser 24 is configured to direct smoke 26 it creates through tubing 30 and into recessed smoking well 20; and wherein in step 214, device 10 made is configured to infuse smoke flavor 12 into glass 31 containing beverage 14 positioned in recessed smoking well 20 by directing smoke 26 created from infuser 24 through tubing 30 and into recessed smoking well 20.

As shown in the Figures, in select example embodiments, the present disclosure embraces device 10 with board 16 or fixture for the setup, smoke infuser 24 with an internal fan 28 that creates smoke 26 once lit and directs to recessed smoking well 20, copper tubing 30 used to route smoke 26 from underneath cloche 32 to recessed smoking well 20, pushbutton switch 72 used to activate infuser 24, recessed smoking well 20 used to provide a recessed area for glass 31 and allow smoke 26 to collect under cloche 32, and cloche 32 used to capture smoke 26 where beverage 14 sits.

A feature of the present disclosure may be its ability to have all aspects of infusing an alcoholic beverage in one place.

Another feature of the present disclosure may be its ability to provide a safer way of infusing an alcoholic beverage with smoke/flavor.

Another feature of the present disclosure may be its ability to mechanically infuse flavor/smoke into an alcoholic beverage with smoke/flavor.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A device for infusing smoke flavor into beverages comprising:
    a board having a board thickness;
    at least one recessed smoking well recessed into a top surface of the board;
    an infuser housed inside of the board, the infuser is configured to create smoke, the infuser including a fan configured to direct the smoke created;

tubing connecting the infuser to the at least one recessed smoking well;
wherein each of the recessed smoking wells further including a smoke passageway interconnecting the top surface of the board to an inside of the recessed smoking well, wherein the smoke passageway including:
 a first smoke hole horizontally drilled from a recessed glass hole in each of the recessed smoking wells;
 a second smoke hole vertically drilled at an angle from the top surface of the board, the first smoke hole is connected to the second smoke hole; and
 wherein, the tubing from the infuser is connected to the second smoke hole for directing smoke created from the infuser through the second smoke hole, through the smoke passageway and out of the first smoke hole into the recessed smoking well; and
wherein, once lit, the infuser is configured to direct smoke it creates through the tubing and into the at least one recessed smoking well.

2. The device for infusing smoke flavor into beverages of claim 1 being configured to infuse smoke flavor into a glass containing the beverage positioned in the at least one recessed smoking well by directing smoke created from the infuser through the tubing and into the at least one recessed smoking well.

3. The device for infusing smoke flavor into beverages of claim 2, wherein each of the at least one recessed smoking wells including a cloche, the cloche is configured to cover the recessed smoking well for holding the smoke inside of the recessed smoking well.

4. The device for infusing smoke flavor into beverages of claim 3, wherein each of the recessed smoking wells including an outer recessed cloche ring configured to receive the cloche therein.

5. The device for infusing smoke flavor into beverages of claim 4, wherein the outer recessed cloche ring has a cloche diameter and a ring thickness, the cloche diameter and the ring thickness are sized and configured to receive the cloche into the outer recessed cloche ring.

6. The device for infusing smoke flavor into beverages of claim 1, wherein each of the recessed smoking wells further including a recessed glass hole configured to recess a glass containing the beverage into the board thickness.

7. The device for infusing smoke flavor into beverages of claim 6, wherein the recessed glass hole including a glass diameter and a depth, the glass diameter and the depth are sized and configured to position and maintain the glass inside of the recessed smoking well.

8. The device for infusing smoke flavor into beverages of claim 1, wherein the second smoke hole including a stub connected thereto for directing the smoke created from the infuser further into the recessed smoking well.

9. The device for infusing smoke flavor into beverages of claim 1, wherein the tubing including a spiraled portion between the infuser and each of the at least one recessed smoking wells, the spiraled portion of the tubing is configured to extend a length of the tubing between the infuser and each of the at least one recessed smoking wells.

10. The device for infusing smoke flavor into beverages of claim 1, wherein the board further including an infuser housing configured for housing the infuser therein on a bottom of the board, the infuser housing including:
 an infuser cutout portion from the bottom of the board through the board thickness to the top surface of the board, the infuser cutout portion is sized and configured to contain the infuser; and
 a recessed wire area adjacent to the infuser cutout portion.

11. The device for infusing smoke flavor into beverages of claim 10, wherein the recessed wire area including:
 a tubing hole cut through to the top surface of the board, the tubing hole is configured to receive the tubing therethrough;
 a switch hole cut through to the top surface of the board, the switch hole is configured to hold a switch for the infuser configured to activate the infuser; and
 a cover removably attached to the recessed wire area configured to conceal the recessed wire area.

12. The device for infusing smoke flavor into beverages of claim 11, wherein the switch of the infuser is installed into the switch hole via a locking nut.

13. The device for infusing smoke flavor into beverages of claim 12, wherein the infuser including wiring connected between the switch in the recessed wire area and the fan of the infuser in the infuser cutout portion via bullet connectors.

14. The device for infusing smoke flavor into beverages of claim 10, wherein the infuser housing further including a frame configured to surround the infuser, the frame including:
 a first frame hole configured to receive wiring therethrough;
 a second fame hole configured to receive the tubing therethrough for connecting the tubing to an outlet of the infuser;
 wherein the frame is glued in positioned in the infuser cutout portion; and
 wherein the tubing including an elbow connection in the recessed wiring area, the elbow connection is configured to connect the outlet of the infuser with the tubing through the second frame hole.

15. The device for infusing smoke flavor into beverages of claim 1, wherein the infuser including:
 a power source selected from a group consisting of: a wired powered source; a battery powered source; and a combination thereof; and
 a smoke box area configured for inserting and lighting a desired flavor material therein, wherein the fan of the infuser is configured to direct smoke created therein out of an outlet.

16. The device for infusing smoke flavor into beverages of claim 1 being a double infuser device, where the double infuser device including:
 two recessed smoking wells, each of the two recessed smoking wells is recessed into the top surface of the board;
 wherein, the tubing including a T-connector for splitting the tubing for connecting the tubing to both of the two recessed smoking wells; and
 wherein, once lit, the infuser is configured to direct smoke it creates through the tubing and into each of the two recessed smoking wells.

17. A device for infusing smoke flavor into beverages comprising:
 a cloche;
 a glass;
 a board having a board thickness;
 a recessed smoking well recessed into a top surface of the board, the recessed smoking well including:
  an outer recessed cloche ring configured to receive the cloche therein, the outer recessed cloche ring has a cloche diameter and a ring thickness, the cloche diameter and the ring thickness are sized and configured to receive the cloche into the outer recessed cloche ring where the cloche is configured to cover the recessed smoking well for holding the smoke inside of the recessed smoking well;
a recessed glass hole configured to recess the glass containing the beverage into the thickness of the board, the recessed glass hole including a glass diameter and a depth, the glass diameter and the depth are sized and configured to position and maintain the glass inside of the recessed smoking well;
a smoke passageway interconnecting the top surface of the board to an inside of the recessed smoking well, the smoke passageway including:
 a first smoke hole horizontally drilled from a recessed glass hole in the recessed smoking well;
 a second smoke hole vertically drilled at an angle from the top surface of the board, the first smoke hole is connected to the second smoke hole;
 wherein, the tubing from the infuser is connected to the second smoke hole for directing smoke created from the infuser through the second smoke hole, through the smoke passageway and out of the first smoke hole into the recessed smoking well;
 wherein the second smoke hole including a stub connected thereto for directing the smoke created from the infuser further into the recessed smoking well;
an infuser housed inside of the board, the infuser is configured to create smoke, the infuser including a fan configured to direct the smoke created;
an infuser housing in the board configured for housing the infuser therein on a bottom of the board, the infuser housing including:
an infuser cutout portion from the bottom of the board through the thickness of the board to the top surface of the board, the infuser cutout portion is sized and configured to contain the infuser;
a recessed wire area adjacent to the infuser cutout portion, the recessed wire area including:
a tubing hole cut through to the top surface of the board, the tubing hole is configured to receive the tubing therethrough;
a switch hole cut through to the top surface of the board, the switch hole is configured to hold a switch for the infuser configured to activate the infuser, wherein the switch of the infuser is installed into the switch hole via a locking nut;
a cover removably attached to the recessed wire area configured to conceal the recessed wire area;
a frame configured to surround the infuser, the frame including:
 a first frame hole configured to receive wiring therethrough;
 a second fame hole configured to receive the tubing therethrough for connecting the tubing to an outlet of the infuser;
 wherein the frame is glued in positioned in the infuser cutout portion;
 the tubing including an elbow connection in the recessed wiring area, the elbow connection is configured to connect the outlet of the infuser with the tubing through the second frame hole;
the infuser including wiring connected between the switch in the recessed wire area and the fan of the infuser in the infuser cutout portion via bullet connectors;
tubing connecting the infuser to the recessed smoking well, the tubing including a spiraled portion between the infuser and the recessed smoking well, the spiraled portion of the tubing is configured to extend a length of the tubing between the infuser and the recessed smoking well;
wherein the infuser including:
 a power source selected from a group consisting of: a wired powered source; a battery powered source; and a combination thereof;
 a smoke box area configured for inserting and lighting a desired flavor material therein, wherein the fan of the infuser is configured to direct smoke created therein out of an outlet;
wherein, once lit, the infuser is configured to direct smoke it creates through the tubing and into the recessed smoking well; and
wherein, the device is configured to infuse smoke flavor into a glass containing the beverage positioned in the recessed smoking well by directing smoke created from the infuser through the tubing and into the recessed smoking well.

18. A method of making a device for infusing smoke flavor into beverages comprising:
providing a board having a board thickness;
cutting at least one recessed smoking well into a top surface of the board;
creating an infuser housing inside the board, the infuser housing is configured for housing an infuser therein on a bottom of the board, the infuser is configured to create smoke, the infuser including a fan configured to direct the smoke created, the infuser housing created including:
 an infuser cutout portion from the bottom of the board through the thickness of the board to the top surface of the board, the infuser cutout portion is sized and configured to contain the infuser;
 a recessed wire area adjacent to the infuser cutout portion;
wiring the infuser to a switch on the top surface of the board;
connecting tubing between the infuser and each of the at least one recessed smoking wells;
wherein, once lit, the infuser is configured to direct smoke it creates through the tubing and into each of the at least one recessed smoking wells; and
wherein, the device made is configured to infuse smoke flavor into a glass containing the beverage positioned in each of the at least one recessed smoking wells by directing smoke created from the infuser through the tubing and into each of the at least one recessed smoking wells.

19. A device for infusing smoke flavor into beverages comprising:
a board having a board thickness;
at least one recessed smoking well recessed into a top surface of the board;
an infuser housed inside of the board, the infuser is configured to create smoke, the infuser including a fan configured to direct the smoke created;
tubing connecting the infuser to the at least one recessed smoking well;
wherein the board further including an infuser housing configured for housing the infuser therein on a bottom of the board, the infuser housing including:
 an infuser cutout portion from the bottom of the board through the board thickness to the top surface of the board, the infuser cutout portion is sized and configured to contain the infuser; and a recessed wire area adjacent to the infuser cutout portion; and wherein, once lit, the infuser is configured to direct smoke it creates through the tubing and into the at least one recessed smoking well.

* * * * *